United States Patent [19]

Soncrant

[11] 4,350,038
[45] Sep. 21, 1982

[54] FLUIDIC TYPE LEAK TESTING MACHINE

[75] Inventor: Donald T. Soncrant, Toledo, Ohio

[73] Assignee: The Stellhorn Company, Toledo, Ohio

[21] Appl. No.: 197,549

[22] Filed: Oct. 16, 1980

Related U.S. Application Data

[63] Continuation-in-part of Ser. No. 151,383, May 19, 1980, abandoned.

[51] Int. Cl.$^3$ .............................................. G01M 3/32
[52] U.S. Cl. .................................................... 73/49.2
[58] Field of Search ....................... 73/49.2, 40, 45.1; 209/591

[56] References Cited

U.S. PATENT DOCUMENTS

| 3,683,676 | 8/1972 | Hass | 73/45.1 |
| 3,813,922 | 6/1974 | Oswald et al. | 73/49.2 |
| 3,872,712 | 3/1975 | Westervelt et al. | 73/49.2 X |

FOREIGN PATENT DOCUMENTS

| 2254021 | 7/1975 | France | 73/49.2 |

*Primary Examiner*—Anthony V. Ciarlante
*Assistant Examiner*—Joseph W. Roskos
*Attorney, Agent, or Firm*—Wilson, Fraser, Barker & Clemens

[57] ABSTRACT

This invention relates to an improved apparatus for effecting the high speed testing of hollow articles or containers for leakage. The apparatus includes a normally closed charge valve and a normally open test valve connected in series between a regulated source of pressurized air and the container. A fluidic start signal sets a first fluidic flip flop device to actuate the charge valve to supply pressurized air to the container and energize a first fluid time delay unit which determines the time that the container is to be filled with air. When the first time delay unit times out, it actuates the test valve to connect the container through a flow meter to a test source of pressurized air to measure the flow rate through the container in the event that any leakage is occuring. The output from the first time delay unit also starts a second fluid time delay unit which determines the test period. If the container is acceptable, the second time delay unit resets a second fluidic flip flop unit, turns on an "accept" light, pulses a counter to record the number of good containers, and resets the first flip flop. In the event that the flow rate exceeds a predetermined value, the flow rate meter actuates a solenoid actuated valve such that the second time delay unit sets the second flip flop and turns on a "reject" light.

13 Claims, 4 Drawing Figures

FLUIDIC TYPE LEAK TESTING MACHINE

CROSS-REFERENCE TO RELATED APPLICATION

This application is a continuation-in-part of U.S. Patent Application Ser. No. 151,383, filed May 19, 1980, now abandoned.

BACKGROUND OF THE INVENTION

There are a multitude of applications in industry where it is necessary to test a hollow fabricated body for fluid leakage. For example, the manufacture of blow plastic containers requires a rapid yet reliable leak tester to insure that the empty containers shipped to the bottler or packer are free from leaks.

A number of leak testers have heretofore been proposed and have primarily been based on a method involving the application of a fluid pressure to the container or object to be leak tested, measuring the flow rate or pressure drop to provide an indication of the existence of any leak, and converting the flow rate or pressure drop measurement into an electronic signal which is then applied to effect the energization of an "accept" or a "reject" light or signal and an appropriate counter. Typical of such prior art leak testers is that disclosed in U.S. Pat. No. 3,872,712 to Westervelt et al.

The testing unit disclosed in the Westervelt patent employes an excessive number of electronically actuated valves and relays to accomplish the required testing sequence. Moreover, the utilization of integrated circuits to effectively reduce the size and complexity of the described unit requires a supply of a significantly reduced, regulated voltage, free of noise and other electronic interference which are characteristic of a factory environment wherein the leak tester unit is most conveniently employed. There is, therefore, need for simplified leak testing apparatus and, in particular, a need to obtain the reliability and accuracy of integrated circuitry in a leak tester without resorting to actual utilization of such circuitry.

SUMMARY OF THE INVENTION

The invention provides an improved leak testing apparatus employing fluidic logic components. Through the utilization of such components, no special voltage reduction, filtering and regulating devices are required and the operation of the device is rendered completely independent of line voltage variations and interferences normally encountered in a factory environment.

In accordance with this invention, a regulated pressure source of air is provided and is supplied in timed sequence to a normally closed charge valve and to a normally open test valve. Both valves are connected in series between the chamber or container to be tested and the regulated source. Upon the operation of a fluidic start signal, the normally closed charge valve is supplied with pressurized air through a fluidic memory unit such as a first flip flop device to shift to its open position and thus connect the container to be tested to the regulated source of air. The first fluidic flip flop also initiates the operation of a first fluid time delay device which provides a delay sufficient to insure that the container to be tested is filled with air and stabilized at the regulated air pressure. When this first fluid timer times out, it generates a fluidic signal to actuate the test valve to disconnect the container from the charge valve and connect the container to be tested to a test source of pressurized air through a flow meter. The test source of pressurized air can either be derived directly from the regulated source, or can be a compensation chamber which has been stabilized at the regulated pressure during the charging operation of the tested container. The output from the first fluid timer also starts a second fluid timer which defines the test period.

If the container or other device being tested is acceptable, the second fluid timer generates a signal through a normally open solenoid operated valve to reset a second fluidic flip flop, turn on an "accept" indicator, and pulse a counter to record the number of good devices. The output signal from the second fluid timer also is passed through an OR gate to reset the first fluidic flip flop which supplies actuating air to the second fluidic flip flop.

The flow meter includes contacts which are closed only if the flow rate exceeds a predetermined value, indicating the existence of an unacceptable degree of leakage in the container or other object being tested. This relay actuates the solenoid actuated valve so that the fluidic signal passes through an OR gate to set the second fluidic flip flop and turn on a "reject" indicator. Manual actuation of a stop button provides a fluidic signal through the first fluidic flip flop to reset same and restore the fluidic circuit to its original condition.

Further objects and advantages of this invention will become apparent to those skilled in the art from the following detailed description, taken in conjunction with the annexed sheets of drawings, on which is shown a preferred embodiment of the invention.

DESCRIPTION OF PREFERRED EMBODIMENT

Figures 1, 2:
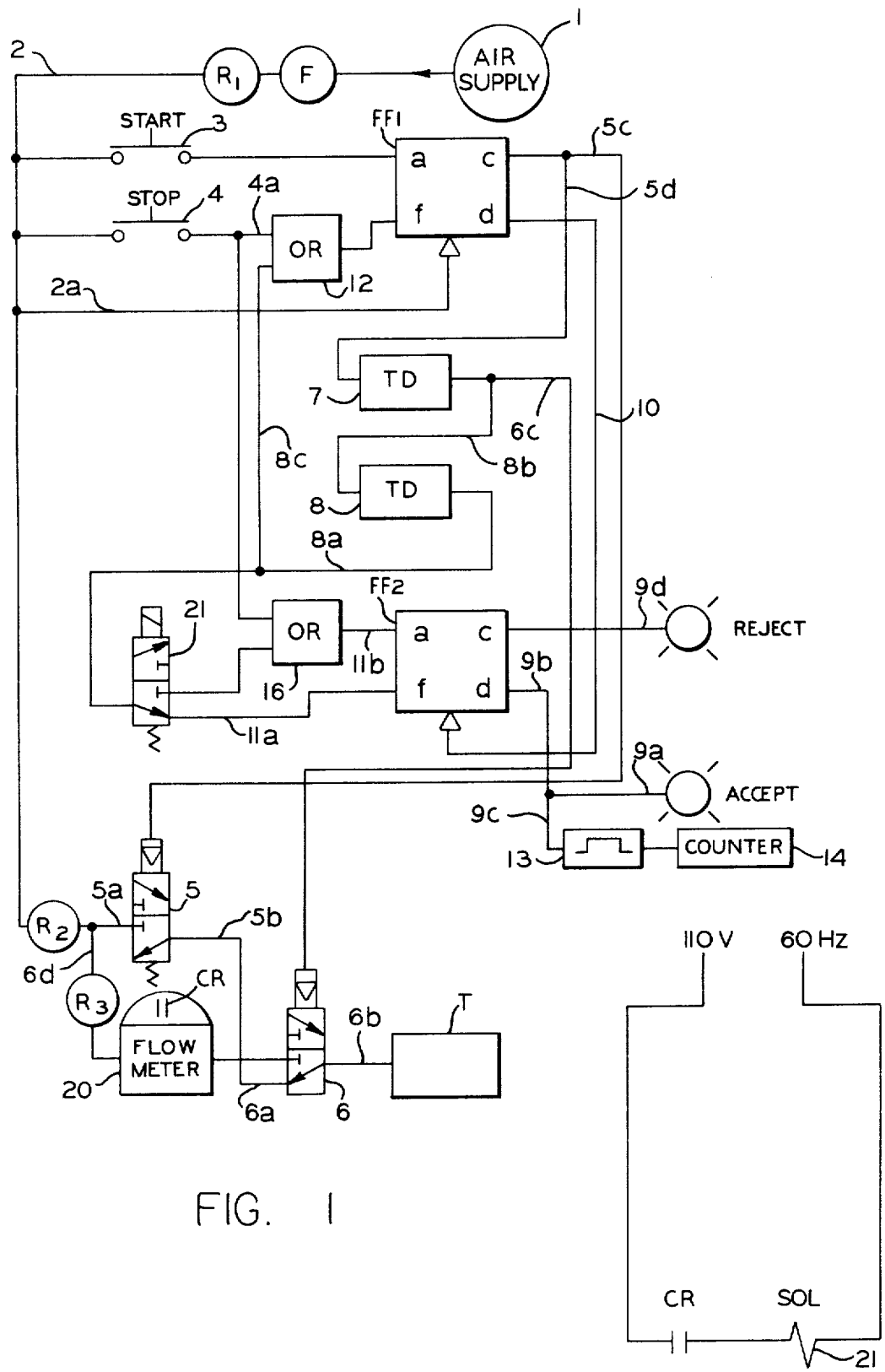
FIG. 1 is a schematic fluidic diagram of a leak testing apparatus embodying this invention, showing the fluid actuated elements in normal positions.
FIG. 2 is a schematic electrical diagram of the electrically actuated components utilized in connection with the apparatus of FIG. 1.

Referring to FIG. 1, the numeral 1 indicates a pressurized source of air such as is commonly found in most industrial plants. Such air is applied to a filter F, then to a pressure regulator R1, and then to a main supply line 2.

The numeral T represents a hollow device which is to be tested for leaks, such as a blown plastic container. Any form of conventional leak proof connection may be provided for the unit T to connect it to a line 6b. It will be noted that the test unit T is alternately supplied with pressurized air from the supply line 2 through a second pressure regulator R2 by a line 5a which connects through a normally closed, pressure operated charge valve 5 to a line 5b which in turn connects to an inlet line 6a of a normally open, pressure operated test valve 6 having the direct connection 6b with the test unit T.

When the charge valve 5 is shifted to its open position by fluid logic circuitry hereinafter described, while valve 6 remains in its indicated position, a charge of pressurized air is supplied from the supply line 2 to the test unit T to fill such unit and cause the pressure in the unit to stabilize at the pressure determined by the pressure regulator R2. When, however, the test valve 6 is pressure actuated to shift to its test position, pressurized air is supplied to the unit T through a flow line 6d which connects to the output side of pressure regulator R2 and leads through a third pressure regulator R3 to a flow meter 20 and thence through valve 6 into the test chamber T.

Flow meter 20 is of any conventional type which will effect the closing of contacts CR when the amount of fluid flow through the meter 20 exceeds a preselected limit. Referring briefly to FIG. 2, the contacts CR of flow meter 20 are connected into an electrical circuit to effect the electrical energization of a solenoid valve 21, whose function will be hereinafter described.

The fluidic actuation of the fluid operated charge valve 5 is effected by a pressurized connection to the main supply line 2 through a start signal button 3 which applies fluid pressure to terminal "a" of a conventional fluidic flip flop unit FF1. Actuating pressure for unit FF1 is supplied by line 2a. Application of such pressure at terminal "a" sets the flip flop unit FF1 and provides pressure through an output terminal "c" to fluid pressure 5c which leads directly to the actuating cylinder of the charge valve 5. Additionally, pressure is supplied through a conduit 5d to a series connected fluid time delay unit 7 which is connected through passage 6c to the actuating cylinder of the test valve 6. Upon completion of the preset delay period, fluid pressure is supplied through the delay unit 7 and conduit 6c to the actuating cylinder of the test valve 6 to effect the shifting of the test valve to connect the test chamber T to the regulated supply through the flow meter 20.

At the same time, a fluid connection 8b effects the actuation of a second fluid time delay unit 8, the output of which is connected through conduits 8a and 8c to one terminal of a fluidic OR gate 12 which has its central output connection connected to the terminal "f" of the fluidic flip flop unit FF1. Thus, flip flop unit FF1 is restored to its original condition after both time delay units 7 and 8 have timed out. The other input terminal of the OR gate 12 is connected to a conduit 4a extending from a manually actuable stop button 4 to the supply line 2.

As is conventional in fluid testing devices, a pair of indicators, respectively shown as an "accept" indicator and a "reject" indicator, are provided which are respectively energized by conventional pneumatic switches (not shown). The "accept" indicator is connected by conduits 9a and 9b to an output terminal "d" of a second fluidic flip flop FF2. A conduit 9c also is connected to the terminal "d" by conduit 9b and energizes a conventional pulsing unit 13, which supplies a single pulse to a counting unit 14 for recording the number of good units passing through the testing unit. Operating pressure for the flip flop FF2 is supplied by conduit 10 which connects to an output terminal "d" of the flip flop FF1. Fluid pressure is applied through a valve 21 and a conduit 11a to an input terminal "f" of the flip flop FF2 to reset such that fluid pressure is generated from the terminal "d" when the fluid pressure is applied to the conduit 10.

The "reject" indicator is connected by a conduit 9d to an output terminal "c" of the fluidic flip flop FF2, hence, is only energized when fluid pressure is applied to a terminal "a" of such flip flop unit. Terminal "a" is actuated either by pressure supplied to conduit 11b by actuation of the stop button 4, which is applied to one input terminal of a fluidic OR gate 16, or by fluid pressure supplied to the other input terminal of the fluidic OR gate 16 through the solenoid operated valve 21 which, as previously mentioned, is energized by closing of contacts CR whenever the flow meter 20 registers a leakage flow rate larger than that which is selected for the particular hollow article T being tested. The actuation of the solenoid 21 applies a pressure pulse to the input terminal of the OR gate 16, thus effecting setting of the fluidic flip flop unit FF2, and causing the energization of the "reject" indicator by a pressure pulse through line 9d, but only until flip flop FF1 is reset.

As will be apparent from the foregoing description, at any time after the initiation of the testing cycle, the testing operation may be interrupted by the momentary closing of the stop button 4 which returns the fluid logic components to their original condition as shown in FIG. 1.

Figure 3:
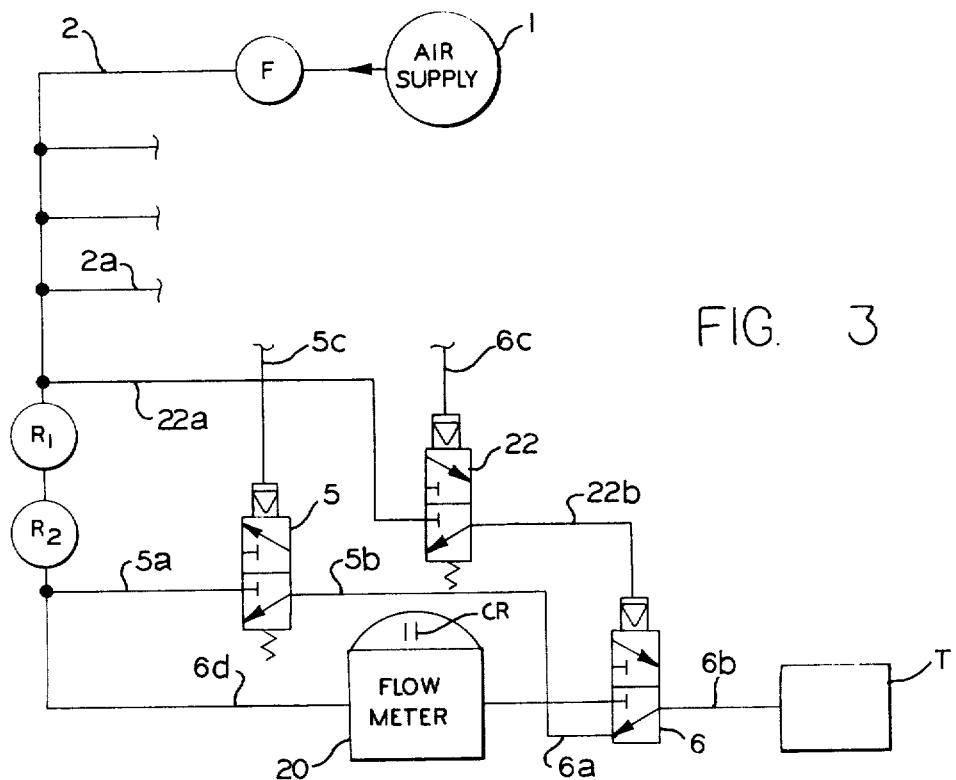
FIG. 3 is a schematic fluidic diagram of an alternate embodiment of the leak testing apparatus of FIG. 1.

Referring to FIG. 3, there is shown an alternate embodiment of the leak testing apparatus of FIG. 1. The portion of the testing apparatus of FIG. 3 which is similar to that of FIG. 1 has not been duplicated in FIG. 3. In FIG. 3, the output of the filter F is connected directly to the supply line 2, while the regulator R1 is connected between the supply line 2 and the input of the regulator R2. The regulator R3 has been eliminated from the apparatus of FIG. 1 such that the regulator R2 supplies pressurized air to the test unit T through either the valve 5 or the flow meter 20.

In addition to supplying pressurized air to the start switch 3, the stop switch 4, and the flip flop FF1 (these elements not shown in FIG. 3), the supply line 2 is connected to a line 22a to supply pressurized air through a normally closed, pressure operated isolation valve 22 to a conduit 22b connected to the actuating cylinder of the test valve 6. The valve 22 has an actuating cylinder connected to receive pressure fluid from the time delay 7 (not shown in FIG. 3) on the line 6c.

Basically, the testing apparatus of FIG. 3 operates in a manner similar to that of the apparatus shown in FIG. 1. By connecting regulators R1 and R2 in series as shown in FIG. 3, the need for a highly accurate regulator is eliminated. Also, the addition of the valve 22 between the input of the time delay 8 and the valve 6 tends to militate against any pressure feedback from the valve 6 to the time delay 8. It should be noted that in some instances the characteristics of the particular valve used for valve 6 may not require the use of the valve 22.

Figure 4:
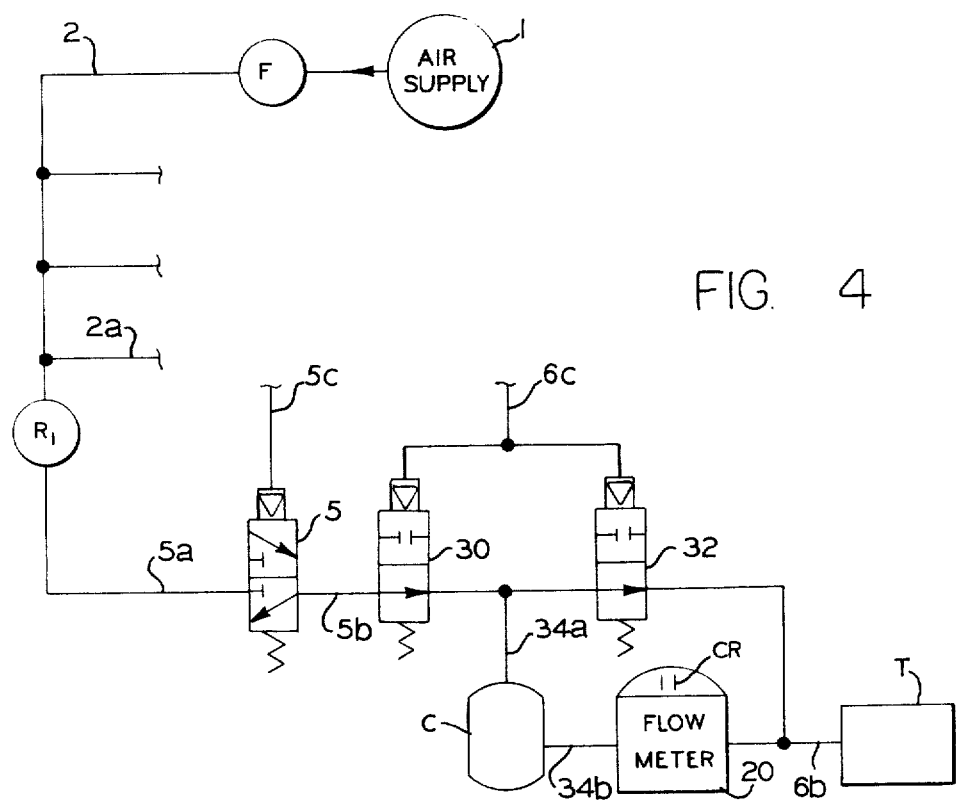
FIG. 4 is a schematic fluidic diagram of another alternate embodiment of the leak testing apparatus of FIG. 1.

Referring to FIG. 4, there is shown another alternate embodiment of the leak testing apparatus of FIG. 1. As was the case for FIG. 3, the portion of the leak testing apparatus of FIG. 4 which is similar to that of FIG. 1 has not been duplicated in FIG. 4. The testing apparatus of FIG. 4 differs from that shown in FIG. 1 in that the apparatus of FIG. 4 utilizes a compensation chamber C which is first stabilized at the regulator pressure during the charging operation of the test unit T, and then functions as a test score of pressurized air during the testing operation of the unit T.

In FIG. 4, the regulator R1 has an input connected to the supply line 2 and an output connected to the input of the charge valve 5. The regulators R2 and R3 have been eliminated. The output of the charge valve 5 is connected through a pair of normally open test valves 30 and 32 to the line 6b which is connected to the test unit T. The test valves 30 and 32 each have an actuating cylinder connected to receive an actuating signal from the time delay unit 7 (not shown in FIG. 4) on the line 6c.

The compensation chamber C has an input 34a connected to receive pressurized air from the output of the charge valve 30, and an output 34b connected to supply the pressurized air through the flow meter 20 to the test unit T during the testing operation of the unit T.

When the charge valve 5 receives an actuating signal on the line 5c from the flip flop FF1 (not shown in FIG. 4), the valve 5 opens to supply pressurized air through the test valve 30 to charge the compensation chamber C to the regulated pressure. Pressurized air is also supplied through the test valve 32 to the test unit T to charge the unit T to the regulated pressure. Thus, the compensation chamber C and the test unit T will be charged to the same pressure, with the exact value of the pressure being unimportant. After a predetermined time delay, the time delay 7 (not shown in FIG. 4) generates an actuating signal on the line 6c to close the test valves 30 and 32. At this time, the direct connection between the compensation chamber C and the test unit T through the test valve 32 has been interrupted and the only connection between the chamber C and the test unit T is through the flow meter 20. Any leakage in the test unit T will result in fluid flow through the meter 20. If the amount of fluid flow through the meter 20 exceeds a preselected limit, the contacts CR will close to actuate the solenoid valve 21 (not shown in FIG. 4) which in turn energizes the reject indicator.

One advantage of the testing apparatus of FIG. 4 is that the pressure regulation by the regulator R1 does not have to be accurately controlled. During the charging operation, both the compensation chamber C and the test unit T are charged to the same pressure. During the testing operation, the compensation chamber C functions as a test source of pressurized air to test the unit T. It should be noted that if the unit T is a heated part off the production line, the compensation chamber C could also be heated to relatively the same temperature. Typically, the volume of the compensation chamber C is at least equal to the volume of the test unit T.

Although fluidic flip flop units are utilized in the preferred embodiments, it should be noted that other types of fluidic memory units could be used, such as a fluidic "S-R" gate, for example.

Those skilled in the art will recognize the aforedescribed apparatus provides a pressure testing mechanism which is capable of rapid, yet reliable operation under high volume production conditions. Since all of the required logic is effected by fluid logic elements, it is apparent that the testing apparatus will be completely independent of variations in line voltage and noise normally encountered in electrical sources employed in a factory environment.

What is claimed is:

1. In a leak testing apparatus for a hollow body having a main source of pressurized air and a regulated source of pressurized air, a fluid charge connection between the hollow body and said regulated source including a fluid actuated normally closed charge valve and a fluid actuated normally open test valve, a fluid test connection between the hollow body and a test source of pressurized air including a flow meter, said flow meter including contact means that are actuated by a predetermined leakage flow through said flow meter, fluid means including a fluidic memory unit for actuating said charge valve to establish said charge connection and for actuating a first fluid time delay, said test valve being responsive to the time out of said first fluid time delay for interupting said charge connection to establish said test connection, a second fluid time delay actuated in response to the time out of said first fluid time delay, means responsive to actuation of said flow meter contact means for indicating a leaking hollow body, and means responsive to the time out of said second fluid time delay for resetting said fluid memory unit to deactuate said charge valve.

2. The apparatus of claim 1 wherein said fluidic memory unit is a fluidic flip flop unit.

3. The apparatus of claim 2 wherein said means responsive to actuation of said contact means includes an "accept" indicator and a "reject" indicator, and means including a second fluidic flip flop unit for selectively energizing said indicators to respectively indicate a non-leaking and a leaking hollow body, said "reject" indicator being energized by actuation of said flow meter contact means.

4. The apparatus of claim 3 wherein said second fluidic flip flop unit is energized in response to the time out of said second fluid time delay.

5. The apparatus of claim 3 or 4 wherein said means responsive to actuation of said contact means includes a solenoid operated fluid valve, said valve being connected between said main source and said second fluid flip flop unit to set same in response to the energization of said solenoid operated valve.

6. The apparatus of claim 2 wherein said means for resetting includes a fluidic OR gate having an output connected to a reset input of said fluidic flip flop unit, one input of said OR gate connected to said second fluid time delay and another input connected to said regulated source through a manually operable "stop" button.

7. The apparatus of claim 3 or 4 wherein the means responsive to actuation of said contact means includes a solenoid operated fluid valve, said valve being connected between said main source and said second fluid flip flop unit through one input and an output connection of an OR fluidic gate to set same in response to the energization of said solenoid operated valve, and means connecting another input of said OR gate to said regulated source through a manually operable "stop" button.

8. The apparatus of claim 1 wherein said test source is a compensation chamber connected to said regulated source through said charge valve.

9. The apparatus of claim 8 including a second fluid actuted normally open test valve connected between said charge valve and said compensation chamber, said second test valve being actuated in response to the time out of said first time delay.

10. The apparatus of claim 1 wherein said test source is said regulated source.

11. The apparatus of claim 10 wherein said test connection includes said test valve, said test valve responsive to the time out of said first time delay for shifting from a normally open charge position establishing said charge connection to a test position establishing said test connection.

12. The apparatus according to claim 11 including a normally closed isolation valve connected between said main source and an actuating cylinder of said test valve, said isolation valve responsive to the time out of said first time delay for actuating said test valve.

13. The apparatus of claim 10 wherein said test connection includes said charge valve connected between said test source and said flow meter.

* * * * *